United States Patent [19]

Clapper

[11] 4,133,518
[45] Jan. 9, 1979

[54] ADJUSTABLE SUPPORT STRUCTURE FOR RELEASABLY POSITIONING AN ARTICLE

[76] Inventor: Terry L. Clapper, 512 Cherry St., Martinsburg, Pa. 16662

[21] Appl. No.: 791,939

[22] Filed: Apr. 28, 1977

[51] Int. Cl.² .......................... B23K 23/00; B23Q 9/02
[52] U.S. Cl. ...................................... 269/91; 164/332; 248/287; 249/83; 269/45
[58] Field of Search ................ 228/2.5, 107, 108, 109, 228/241; 269/1, 97, 45, 91, 246; 248/287; 164/54, 332; 249/86, 83

[56] References Cited

U.S. PATENT DOCUMENTS

| | | | |
|---|---|---|---|
| 1,313,061 | 8/1919 | Brown | 248/287 X |
| 2,276,823 | 3/1942 | Cadwell | 249/86 |
| 2,731,712 | 1/1956 | Laux | 269/97 X |
| 2,825,128 | 3/1958 | Manning | 269/91 |
| 3,899,825 | 8/1975 | Hofer | 228/2.5 X |

*Primary Examiner*—Al Lawrence Smith
*Assistant Examiner*—K. J. Ramsey
*Attorney, Agent, or Firm*—Birch, Stewart, Kolasch & Birch

[57] ABSTRACT

This application involves an adjustable support structure for positioning an exothermic welding mold or other article, i.e., pipe, angle iron, etc., adjacent a surface comprising: an attaching member designed to be removably affixed to a supporting surface; a vertical support member, adjustably mounted on said attaching member; a horizontal support member, adjustably mounted on said vertical support member; an adjusting rod, adjustably mounted transverse to said horizontal supporting member; wherein said adjusting rod includes a member for rotating the adjusting rod thereby imparting a reciprocating motion to an abutting plate mounted on one end of the adjusting rod and said abutting plate being designed to releasably engage an exothermic mold or other article, i.e., pipe, angle iron, etc., adjacent a surface to be welded.

28 Claims, 7 Drawing Figures

ADJUSTABLE SUPPORT STRUCTURE FOR RELEASABLY POSITIONING AN ARTICLE

BACKGROUND OF THE INVENTION

1. Field of the Invention

The present application is directed to a support structure for positioning an exothermic welding mold adjacent a surface to which an electrical grounding wire is to be welded. The support structure may be used for positioning other articles such as a pipe, angle iron, small beam, etc., adjacent a surface to which the article is to be welded.

2. Prior Art

Electrical grounding is important in all phases of modern electrical power system operations. At electrical sub-stations, grounding is of particular importance since they are sites of high concentration of electrical power and continuity of electrical service is mandatory.

The electrical grounding of sub-stations serves the following purposes:

1. Protection against lightening and surge currents.
2. System grounding:
    a. To stabilize current potentials with respect to ground.
    b. To provide a means of circuit relaying to clear ground faults.

In addition, it is important that electrical grounding be provided for normally non-current carrying structures and parts and for auxiliary low voltage circuits for the safety of personnel.

Low resistance and adequate current carrying capacity are important requirements for the electrical grounding of sub-stations. Also, low resistance is very important for electrical grounding protection against lightning and electrical surges so that the high current disturbances of short duration will pass quickly to the earth.

To ensure the proper electrical grounding, it is important that the conductor used between the ground rods and the equipment is of a sufficient cross-sectional area to prevent melting of the conductor during the period that the fault current flows. Even though the electrical grounding protective device is used for a short period of time, adequate grounding cables and the extra protection of welded connections is a small investment when considering the total cost of the station.

One method of connecting a ground wire to a metal framework has been through the use of a nut and bolt. A hole is drilled into the steel structure and a bolt is inserted therethrough. A nut is attached to the threaded portion of the bolt and the ground wire is looped adjacent the head portion of the bolt. By screwing the nut onto the threaded portion of the bolt, the ground cable is firmly affixed adjacent the steel structure. This method of connecting a ground wire to a steel structure has a number of drawbacks:

1. The nut has a tendency to loosen from the bolt with the result that the electrical grounding cable is not firmly affixed adjacent the steel structure or may be dislodged.
2. The bolts have a tendency to corrode with the result that the electrical grounding cable may become dislodged from the metal structure.
3. The bolts tend to have a different current carrying capacity than the electrical grounding conductors. Thus, bolts are not an ideal component of an electrical grounding system.

A preferred way of connecting an electrical grounding cable to a steel structure is by the use of an exothermic weld mold. One method of achieving this weld is by use of the CADWELD process, which employs a high temperature type graphite mold and an exothermic charge which includes a welding charge and the starting powder. A welded connection between the electrical grounding cable and the metal structure does not have a tendency to loosen or to corrode since no mechanical pressures or contact surfaces are involved. In addition, the welded material may be selected to have an equal current carrying capacity as that of the electrical grounding cable.

Although it is preferred that the electrical grounding cable be welded to the metal structure, it is sometimes extremely difficult especially when grounding large towers or the steel support structures of a large building for a single individual to employ an exothermic mold. It has been found that in many instances it is necessary for two employees to work as a team to position the exothermic mold adjacent the electrical grounding cable and the steel structure to produce the necessary welded connection. Utilizing two individuals to position the exothermic mold is both expensive and troublesome especially, as stated above, when dealing with tall towers and the steel support structures of large buildings.

In addition, it is sometimes difficult to position an article such as a pipe, angle iron or small beam adjacent a surface to which it is to be welded. As discussed above, the present invention may readily be utilized to position such an article adjacent a surface.

SUMMARY OF THE INVENTION

It is an object of the present invention to provide an adjustable support structure for positioning an exothermic mold adjacent a steel surface to which an electrical grounding cable is to be welded.

Another object of the present invention is to provide an adjustable support structure which may readily position an exothermic mold adjacent either a continuous surface or adjacent to intersecting surfaces.

A further object of the present invention is to provide an adjustable supporting structure which may readily be attached to various thicknesses of metal to which the electrical grounding cable is to be welded.

A still further object of the present invention is to provide an adjustable supporting structure which is easily utilized by a single individual to position the exothermic molds adjacent the metal surface to which an electrical grounding cable is to be welded.

A still further object of the present invention is to provide a compact, easily portable adjustable supporting structure which may readily and easily be transported by a single individual especially to remote portions of a high tower or the structural framework of a tall building where it may be necessary to weld an electrical grounding cable to the steel support structure.

Another object of the present invention is to provide an adjustable supporting structure which is readily adjusted not only in the vertical direction but also in the horizontal direction to precisely position the exothermic mold in the exact location where the weld is necessary.

A still further object of the present invention is to provide an adjustable supporting structure which may readily position an article such as a pipe, angle iron or small beam adjacent a surface to which it is to be welded.

Other objects and further scope of applicability of the present invention will become apparent in the detailed description given hereinafter; it should be understood, however, that the detailed description and the specific examples, while indicating preferred embodiments of the invention, are given by way of illustration only, since various changes and modifications within the spirit and scope of the invention will become apparent to those skilled from the art in this detailed description.

These and other objects of the present invention are fulfilled by constructing an adjustable supporting member which is readily attached to a steel surface and includes an adjustable vertical support member, an adjustable horizontal member and, also, an adjusting rod which is transversally adjustable relative to the horizontal support member. By positioning the attaching member on a portion of the metal surface to which the electrical grounding cable or article is to be welded and by adjusting the vertical supporting member, the horizontal supporting member and the adjusting rod, which includes a handle and a threaded portion and thus is readily adjustable in the transverse direction, an exothermic mold or other article may be exactly positioned adjacent the metal surface to which the electrical grounding cable or article is to be welded.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
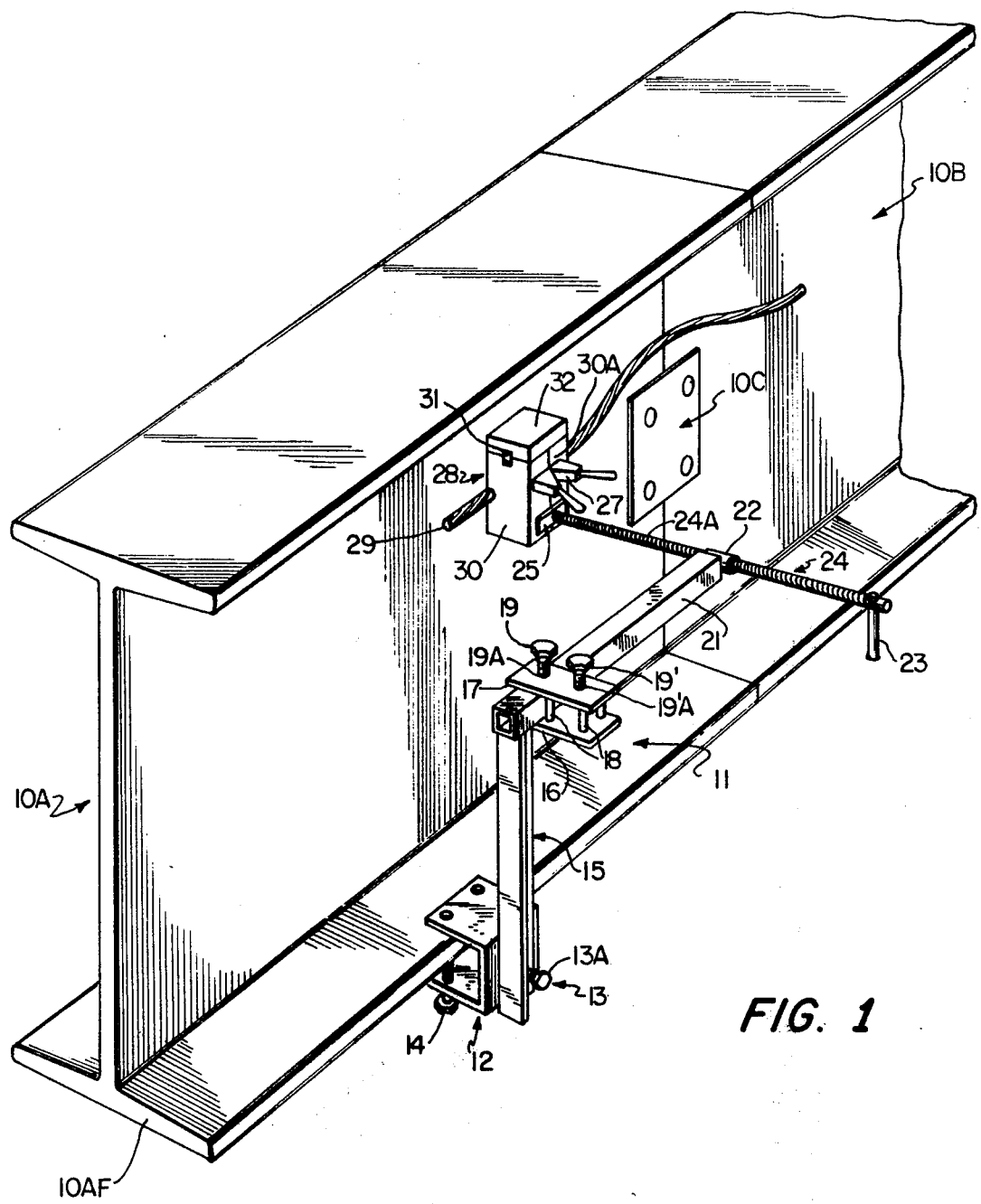
FIG. 1 is a perspective view of the adjustable supporting member showing the positioning of an exothermic mold adjacent to a portion of an I-beam.

Referring in detail to FIG. 1, two I-beams 10A, 10B are illustrated as being connected together by a plate 10C. As is conventional in this art, it is desirable to attach an electrical grounding cable across the connection between the I-beam 10A and the I-beam 10B. As discussed above, it is preferred that an electrical grounding cable 29 be welded to the I-beams by means of an exothermic mold 28. The exothermic mold 28 includes a handle portion 27 which is designed to pivot the two halves 30, 30A of the mold 28 so as to readily position the mold adjacent the electrical grounding cable and the I-beam surface. In addition, the mold 28 includes a hinge 31 which pivotally mounts the top portion 32. In operation, an individual would position the mold 28 adjacent the electrical grounding cable and the surface of the I-beam to which the electrical grounding cable is to be welded. The top portion 32 of the mold 28 would be pivoted to the open position permitting an individual operating the mold to insert a welding charge and an exothermic charge in a cavity within the mold. The top portion 32 would then be pivoted closed and an individual operating the mold would ignite the exothermic charge thereby welding the electrical grounding cable 29 to the I-beam 10A. In the normal mode of operation, it is extremely difficult for a single individual to hold the mold 28 in position and thereafter ignite the exothermic charge.

Figure 3:
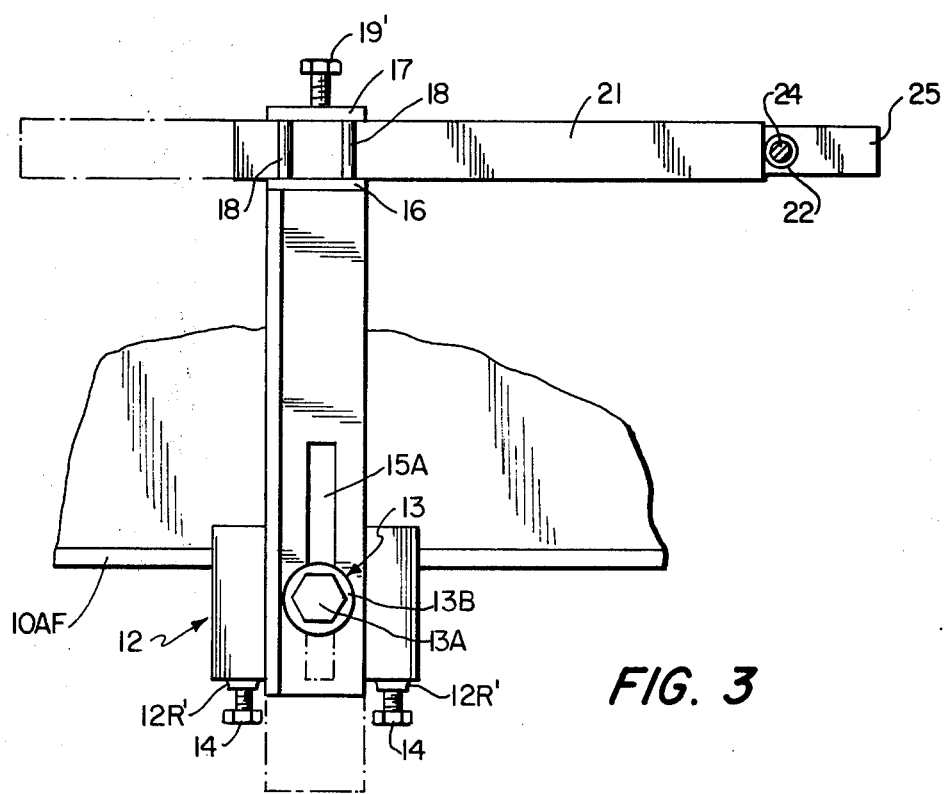
FIG. 3 is a front view of the adjustable support member as shown in FIG. 1.

The present invention solves the abovementioned problem by providing an adjustable supporting member generally referred to by character 11, wherein an attaching member 12 is removably connected to the flange portion of the I-beam 10A by means of bolts 14. It should be noted, that while the embodiment shown in FIG. 1 utilizes bolts 14 for removably connecting the attaching member 12 to the I-beam flange, other suitable means of connecting the attaching member 12 to the beam may be readily employed. The adjustable support member 11 further includes a first support member 15 which is adjustably connected to the attaching member 12 by means of the bolt 13. The bolt 13 includes a head portion 13A and an axially removed portion 13B which is designed to firmly abut against the first support member 15 when the bolt 13 is tighten into a threaded hole in the attaching member 12. Referring to FIG. 3, the first support member 15 is shown to include a slot 15A in which the adjustable support member may be vertically adjusted relative to the I-beam 10A. The bolt 13 is inserted in a threaded hole in the attaching member 12 with the first support member 15 inserted therebetween, upon tightening the head portion 13A the axially removed portion 13B firmly abuts against the first support member 15 thereby holding it in position.

Figure 4:
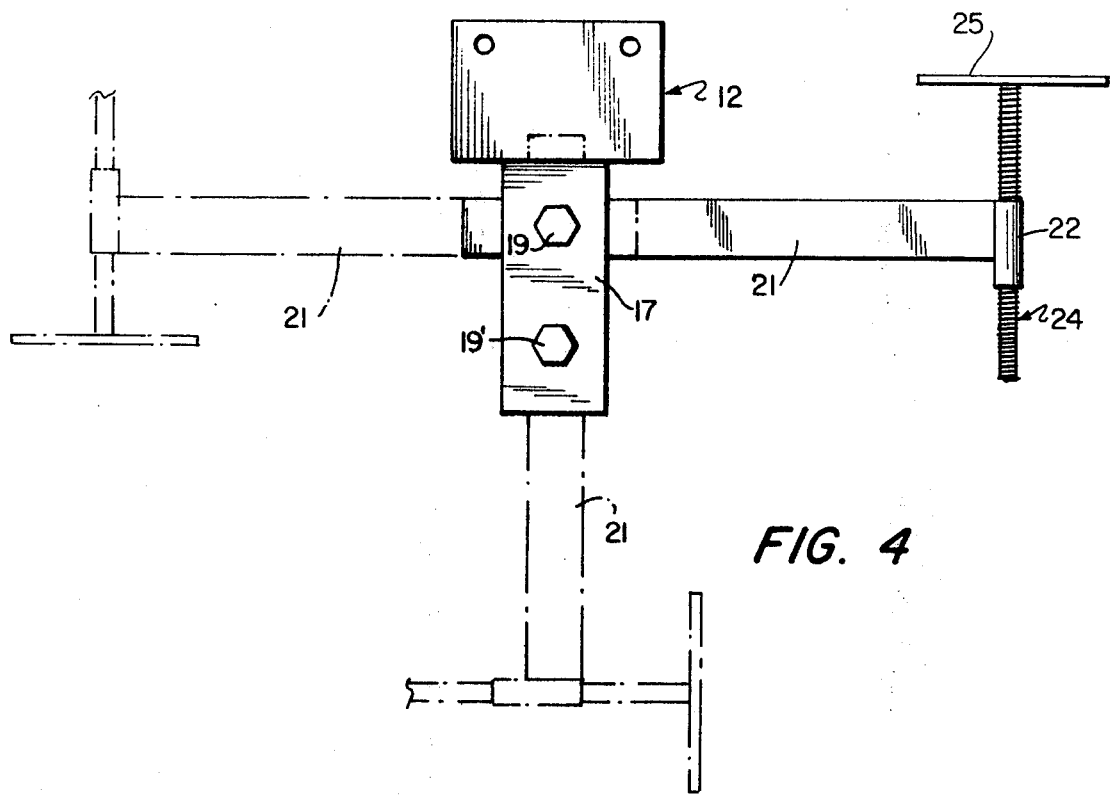
FIG. 4 is a top view of the adjustable support member as shown in FIG. 1 and including in dotted lines a number of various directions in which the horizontal supporting member may be positioned.

As shown in FIG. 1, the first support member 15 includes two plates 16, 17 which are connected to one end of the first support member. The two plates 16, 17 are spaced from each other by means of six pins 18. The six pins 18 are positioned adjacent the four corners of the rectangular plates 16, 17 and intermediate the ends so as to form opening which readily accommodate the second support member 21. Referring to FIG. 4, the second support member 21 is shown in solid lines as projecting from the first support member 15. In dotted lines the second support member 21 is shown projecting from the left of the first support member 15 and also at an angle of 90 degrees from the second support member 21 shown in solid lines. It is readily apparent, from the illustration shown in FIG. 4, that when the attaching member 12 is positioned on a suitable surface, the second support member 21 may project in four directions in each opening from the first support member 15. Bolts 19, 19' are threaded into openings 19A, 19'A in the plate 17. Upon tightening the bolts 19, 19' the second support member 21 is firmly affixed relative to the first support member 15.

As shown in FIG. 1, the second support member 21 includes a guide 22 affixed to one end of the second support member 21. The guide 22 is designed to accommodate an adjusting rod 24 which is transverse to the second support member 21. As shown in FIG. 1, one form of the present invention would be to design the adjusting rod 24 to include a helically threaded portion which would mate with the threads on the interior of the surface of the guide member 22. By providing the adjusting rod 24 with a handle 23 and a helically threaded portion 24A, an individual may readily adjust the position of the mold abutting plate 25 to precisely position the mold 28 relative to the surface of the I-beam 10A. The mold abutting plate 25 is rotatably mounted at an end of the adjusting rod 24 so as to easily permit the positioning of the mold abutting plate 25 adjacent the mold 28 as the adjusting rod is reciprocated towards the exothermic mold 28. It is to be understood that although FIG. 1 discloses a handle mounted adjacent one end of the adjustable rod 24, other suitable means of rotating the adjusting rod may be employed without departing from the substance of the present invention. In addition, while the Figures disclose a helically threaded portion 24A, this portion may readily be substituted with other suitable means of providing a reciprocating action to the adjusting rod 24, for example, conventional threads may be employed.

Figure 2:
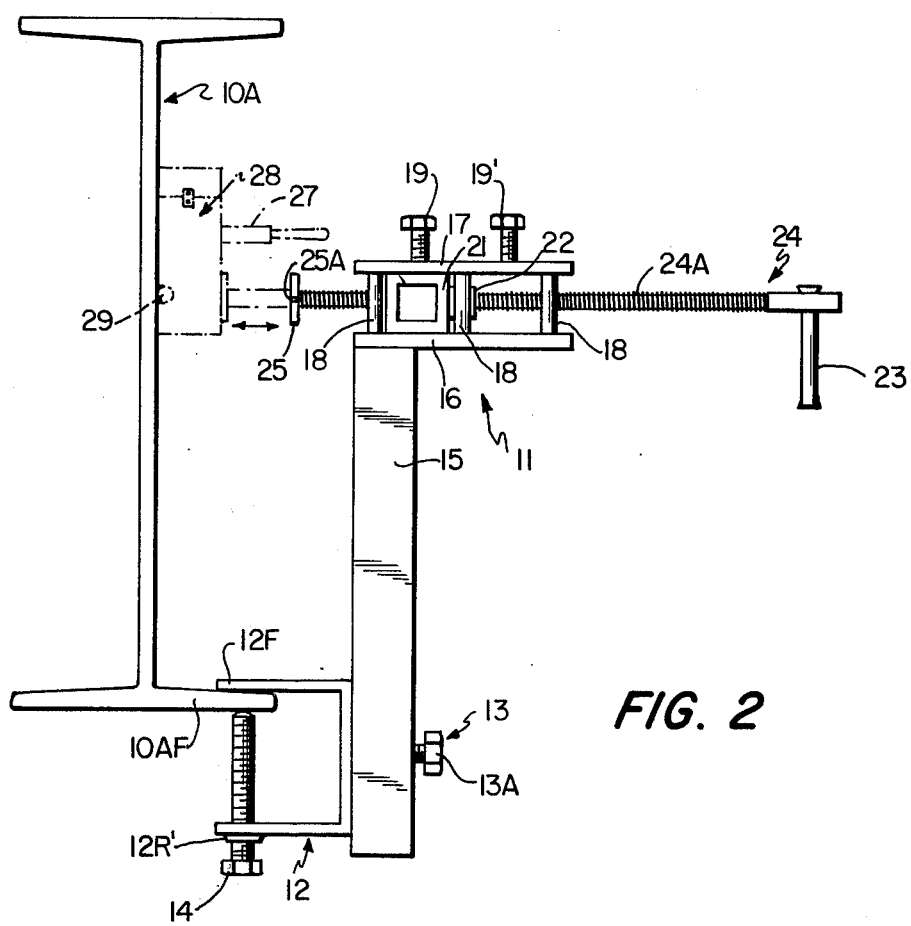
FIG. 2 is a side view of the adjustable support member as shown in FIG. 1.

Referring to FIG. 2, there is shown a side view of the adjustable support member 11 attached to a flange 10AF of an I-beam 10A. The adjustable support member 11 is attached to the flange by means of an attaching member 12 which includes a flange portion 12F which abuts against one surface of the flange of the I-beam and further includes at least one bolt 14 for selectively engaging the other surface of the flange member 10AF. In addition, the attaching member 12 may include reinforcing portions which provide a larger threaded area into which the threaded portions of the bolts 13, 14 are positioned. The serviceable life of the attaching member 12 may be increased by providing the reinforced portions such as 12R'.

As shown in FIG. 2, the second support member 21 is positioned between the plates 16, 17 and also between the pins 18. An individual may freely reciprocate the second support member 21 between the plates and the pins to precisely adjust one component of the adjustable support member. As discussed above, upon tightening the bolt 19 or 19' the second support member 21 if firmly affixed relative to the first support member 15. It is noted that the second support member 21 is positioned within a first opening between the plates 16, 17 and the pins 18. An individual may readily position the second support member 21 in a second opening between the plates 16, 17 and the pins 18. When positioned in the second opening and upon tightening the bolt 19' the second support member 21 is firmly affixed relative to the first support member 15. This capability of positioning the second support member within either the first or second opening readily permits adjustment which is necessary to accommodate various size articles adjacent a surface to which an article is to be employed or to which an article is to be welded. For example, if an exothermic mold is to be used or an article is to be welded to an I-beam which includes a relatively short flange portion the second opening between the plates 16, 17 and the pins 18 may be employed to space the second support member a sufficient distance from the surface of the I-beam to accommodate the width of the exothermic mold or the dimensions of the article.

In addition, FIG. 2 shows in dotted lines the reciprocating motion of the mold abutting plate 25 which is attached to the adjustable rod 24. As discussed above, the adjustable abutting plate 25 may be rotatably mounted on the adjustable rod 24 so as to facilitate the reciprocating motion of the mold abutting plate as it approaches the exothermic mold 28 in the region of the pivotable handles 27. By permitting the free rotation of the mold abutting plate 25 it does not have a tendency to strike against the pivotable handles 27 as the adjusting rod 24 is reciprocated towards the exothermic mold 28. Further, the mold abutting plate 25 may be positioned on the adjustable rod 24 by means of a pin 25A which may include an enlarged head portion. It is to be understood, that when a pin with an enlarged head is used the mold abutting plate 25 may include a corresponding recess into which the enlarged head portion may be positioned. By positioning the enlarged head within a recess the surface of the mold abutting plate 25 is uniform so as to apply equal pressure to an exothermic mold or other article.

FIG. 3 illustrates a front view of the adjustable support member 11 as shown in FIG. 1. The attaching member 12 is shown to include two bolts 14 which firmly engage the flange 10AF of the I-beam 10A to affix the attaching member 12 to the flange. Each threaded opening in the attaching member 12 which accommodate the bolts 14 may include a reinforced portion 12R' for lengthening the threaded portion into which the bolts 14 are positioned. The first support member 15 includes a slot 15A which is guided in its reciprocating motion by the bolt 13. An individual may readily adjust the vertical height of the first support member 15 by loosening the bolt 13 thereby disengaging the axially removed portion 13B from the surface of the first support member 15 to permit the vertical reciprocation of the support member within the slot 15A, as shown in the dotted lines. When the exact vertical height is achieved the bolt 13 is tighten thereby abutting the axially removed portion 13B against the first support member 15 and firmly affixing it relative to the attaching member 12.

Further, FIG. 3 shows the second support member 21 as being reciprocatably mounted within the framework of the plates 16, 17 and the pins 18. This reciprocating motion of the second support member 21 is shown in FIG. 3 by dotted lines. As discussed above, upon precisely positioning the second support member 21 relative to the positioning of the exothermic mold 28, the bolt 19 would be tightened into the threaded opening in the plate 17 thereby abutting against a portion of the second support member 21 and firmly affixing it relative to the first support member 15.

The upper right hand portion of FIG. 3 shows the guide member 22 fixly attached to the second support member 21. The adjusting rod 24 is reciprocatively positioned within the guide member 22 by means of helical screw threads or other suitable means. The mold abutting plate 25 is shown attached to the adjusting rod 24.

The adjustable support member 11 is universally adjustable. FIG. 4 illustrates a few of the number of various positions in which the second support member 21 may be mounted relative to the first support member 15. With the vertical support member 15 projecting upwardly from the attaching member 12 it is possible to position the second support member 21 in four different positions relative to each opening between the plates 16, 17 and the pins 18. As shown in FIGS. 1 and 2, six openings are defined between the plates 16, 17 and the pins 18, the elongated sides define four openings and the width defines two additional openings. Thus, the second support member may be positioned in twenty-four different directions within the six openings defined between the plates 16, 17 and the pins 18. If the first support member 15 were to project downwardly from the attaching member 12 or at an angle thereto the second support member 21 may project in the same twenty-four various positions relative to the first support member 15 but in a direction offset by 180 degrees or an angle from the positioning of the first support member 15 as shown in FIG. 1. By changing the relative positioning of the second support member 21 relative to the first support member 15 an individual may utilize the adjustable support member 11 to weld electrical grounding wires or other articles, i.e., pipe, angle iron, etc., to a number of different surfaces which may be offset at various angles from each other. By selecting an appropriate point at which the attaching member 12 is affixed to a supporting surface, an individual may utilize the adjustable support member 11 to weld a number of electrical grounding wires or other articles to various metal surfaces which are at an angle relative to each other without repositioning the attaching member 12.

Figure 5:
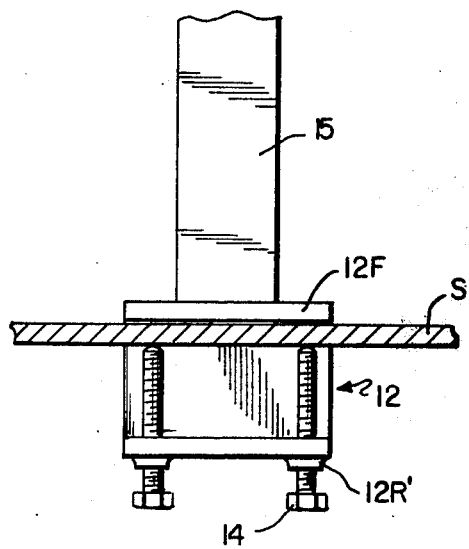
FIG. 5 illustrates the attaching member connected to a horizontal surface.

FIG. 5 illustrates one embodiment of the present invention wherein the attaching member 12 is connected to a horizontal supporting surface S. As shown in FIG. 5, the horizontal supporting surface S is positioned between the flange 12F of the attaching member 12 and the bolts 14. As discussed above, the attaching member 12 may include a reinforcing portion 12R' which increases the length of the threaded surface into which the bolts 14 are positioned.

Figure 6:
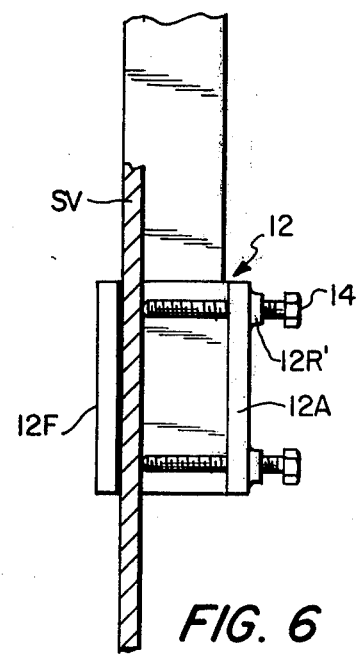
FIG. 6 illustrates the attaching member connected to a vertical surface.

FIG. 6 illustrates another embodiment of the present invention in which the attaching member 12 is positioned adjacent a vertical supporting surface SV. It should be understood, that the attaching member 12 may be positioned on any suitable supporting surface. In addition, the distance between the flange 12F and the surface 12A of the attaching member 12 may be designed to accommodate a variety of different thicknesses of the supporting surface. It should be noted, that while the drawings of the present application disclose the attaching member 12 as being directly connected to a workpiece to which an article is to be positioned that this is not limitative of the present invention. The attaching member 12 may be attached to a flat piece of material that is subsequently attached to a workpiece by means of a C-shaped clamp or other suitable means. This embodiment of the present invention may be utilized when an exothermic mold or other article is to be positioned adjacent a relatively thick flange of a workpiece. In this manner the dimension of the attaching member 12 remains constant and an appropriate size C-shaped clamp may be employed to affix the flat piece of material to the workpiece surface.

Figure 7:
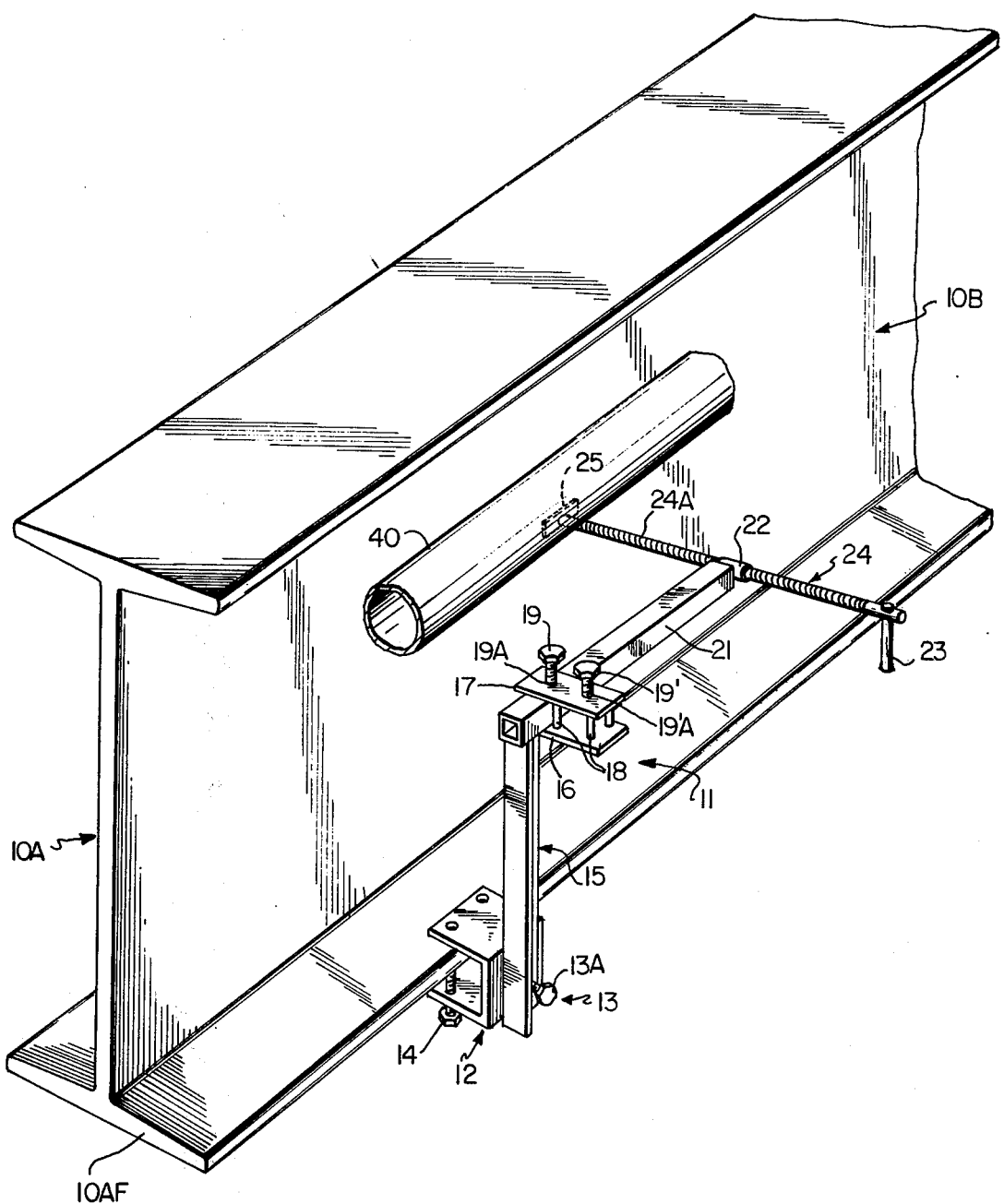
FIG. 7 is a perspective view of the adjustable supporting member showing the positioning of a pipe adjacent to a portion of an I-beam.

Referring to FIG. 7, there is illustrated an example of an additional use of the article support member of the present invention. As discussed above, it is often difficult to support an article, such as a pipe, angle iron or small beam, etc., adjacent a surface to which the article is to be welded. As shown in FIG. 7, the present invention may readily be utilized to position an article, such as a pipe 40, adjacent an I-beam. While the embodiment illustrated in FIG. 7 shows the positioning being implemented by means of the adjusting rod, it is to be understood that the second support member and/or the first support member may readily be employed to provide the necessary support for precisely positioning an article adjacent a workpiece surface.

While the drawings of the present invention illustrate proportional sizes between the attaching member, the first support member, the second support member and the adjusting rod it is readily understood that the size and shape of the individual members may readily be modified to accommodate specific structural sizes of the elements of the support structure to which the adjustable supporting member 11 is to be affixed. For example, the attaching member 12 may be designed to accommodate a flat supporting surface, a tubular supporting surface, an L-shaped supporting surface or a number of various surfaces to which it is desired to weld an article, an electrical grounding cable, an electrical grounding stud or an electrical grounding bar by conventional welding means or by means of an exothermic mold 28.

In operation, an individual may utilize the present invention as illustrated in FIG. 1 by positioning the attaching member 12 adjacent a suitable supporting surface, such as a flange of an I-beam, and tightening the bolts 14 thereby firmly affixing the attaching member 12 to the supporting surface. After the desired vertical position is obtained by reciprocating the first support member 15 along the slot 15A, the bolt 13 is tightened, abutting the axially removed portion 13B against the first support member 15 and firmly affixing it thereto. The second support member 21 is reciprocated in either the first or second openings between the plates 16, 17 and the pins 18 to the desired position and thereafter the bolt 19 or 19' would be tightened thereby firmly affixing the second support member 21 relative to the first support member 15. Finally, the adjusting rod 24 would be reciprocated into position by rotating the handle 23 or other suitable rotating means thereby positioning the mold abutting plate 25 adjacent the exothermic mold 28, either above or beneath the pivotable handles 27. After the adjustable support member 11 is in position, the top portion 32 of the exothermic mold 28 may be pivoted opened and an individual may insert the welding charge and the starting powder into the cavity within the mold, thereafter the top portion 32 would be pivoted closed and the starting powder ignited thereby welding the electrical grounding cable 29 to the I-beam 10A. If the present invention is utilized to position an article, such as a pipe, angle iron or small beam, etc., adjacent a surface the operation is essentially the same as outlined above except that the article is positioned by means of supporting the article from the adjusting rod, the second support member or the first support member.

As discussed above, the adjustable support member 11 is designed in such a manner as to be conveniently utilized by a single individual. Thus, the cost involved with welding an electrical grounding cable to a surface is reduced because two individuals are no longer necessary to operate the exothermic mold. In addition, it has been found that the productivity of an individual is greatly increased when utilizing the adjustable support member of the present invention in combination with an exothermic mold. Further, the present invention is readily adaptable and economically utilized for positioning an article adjacent a workpiece surface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An adjustable support structure for positioning an exothermic welding mold adjacent a surface comprising:
   an attaching member adapted to be removably affixed to a supporting surface;
   a first support member, adjustably mounted on said attaching member;
   a second support member, adjustably mounted in a frame on said first support member;
   said frame including two plates spaced from each other by a plurality of pins forming at least four openings into which said second support member may be reciprocatably positioned in a plurality of positions relative to said first support member;
   an adjusting rod, adjustably mounted transverse to said second support member;
   said adjusting rod includes means for rotating the adjusting rod thereby imparting a reciprocating motion to an abutting plate mounted on one end of the adjusting rod; and
   said abutting plate being adapted to releasably engage an exothermic mold.

2. An adjustable support structure for positioning an article adjacent a surface comprising:
   an attaching member adapted to be removably affixed to a supporting surface;
   a first support member, adjustably mounted on said attaching member;
   a second support member, adjustably mounted in a frame on said support member;
   said frame including two plates spaced from each other by a plurality of pins forming at least four openings into which said second support member may be reciprocatably positioned in a plurality of positions relative to said first support member;
   an adjusting rod, adjustably mounted transverse to said second support member;
   said adjusting rod includes means for rotating the adjusting rod thereby imparting a reciprocating motion to an abutting plate mounted on one end of the adjusting rod; and
   said abutting plate, said first support member and said second support member being adapted to releasably engage an article to hold an article adjacent to a surface.

3. An adjustable support structure for positioning an exothermic welding mold adjacent a surface comprising:
   an attaching member adapted to be removably affixed to a supporting surface;
   a first support member, adjustably mounted on said attaching member;
   a second support member, adjustably mounted in a frame on said first support member;
   said frame including two plates spaced from each other by a plurality of pins forming at least six openings into which said second support member may be reciprocatably positioned in a plurality of positions relative to said first support member;
   an adjusting rod, adjustably mounted transverse to said second support member;
   said adjusting rod includes means for rotating the adjusting rod thereby imparting a reciprocating motion to an abutting plate mounted on one end of the adjusting rod; and
   said abutting plate being adapted to releasably engage an exothermic mold.

4. An adjustable support structure for positioning an article adjacent a surface comprising:
   an attaching member adapted to be removably affixed to a supporting surface;
   a first support member, adjustably mounted on said attaching member;
   a second support member, adjustably mounted in a frame on said first support member;
   said frame including two plates spaced from each other by a plurality of pins forming at least six openings into which said second support member may be reciprocatably positioned in a plurality of positions relative to said first support member;
   an adjusting rod, adjustably mounted transverse to said second support member;
   said adjusting rod includes means for rotating the adjusting rod thereby imparting a reciprocating motion to an abutting plate mounted on one end of the adjusting rod; and
   said abutting plate, said first support member and said second support member being adapted to releasably engage an article to hold an article adjacent a surface.

5. An adjustable support structure according to claim 1, wherein the attaching member includes a flange adapted to mate with one side of a supporting surface and reciprocating means adapted to engage an opposite side of a supporting surface to selectively releasably retain the attaching member to the supporting surface.

6. An adjustable support structure according to claim 5, wherein the reciprocating means comprises at least one bolt threaded into an opening in the attaching member and adapted to releasably retain the attaching member to the supporting surface.

7. An adjustable support structure according to claim 1, wherein the first support member includes an elongated slot adapted to permit adjustment of the first support member.

8. An adjustable support structure according to claim 7, including means for selectively releasably retaining the adjustment of the first support member.

9. An adjustable support structure according to claim 8, wherein the means for selectively releasably retaining the first support member comprises a bolt threaded in a second opening in the attaching member.

10. An adjustable support structure according to claim 3, including means for selectively releasably retaining the second support member relative to the first support member.

11. An adjustable support structure according to claim 10, wherein the means for selectively releasably retaining the second support member relative to the first support member comprises a bolt threaded in an opening in one of said two plates.

12. An adjustable support structure according to claim 1, wherein said adjusting rod is rotatably and reciprocatable mounted within a guide mounted on the second support member.

13. An adjustable support structure according to claim 12, wherein at least a portion of the adjusting rod is threaded and adapted to mate with a threaded opening in said guide.

14. An adjustable support structure according to claim 12, wherein at least a portion of the adjusting rod includes helical threads adapted to mate with a helically threaded opening in said guide.

15. An adjustable support structure according to claim 1, wherein the means for rotating the adjusting rod comprises a handle mounted at an end portion thereof.

16. An adjustable support structure according to claim 1, wherein the abutting plate is rotatably mounted at one end of the adjusting rod.

17. An adjustable support structure according to claim 2, wherein the attaching member includes a flange adapted to mate with one side of a supporting surface and reciprocating means adapted to engage an opposite side of a supporting surface to selectively releasably retain the attaching member to the supporting surface.

18. An adjustable support structure according to claim 17, wherein the reciprocating means comprises at least one bolt threaded into an opening in the attaching member and adapted to releasably retain the attaching member to the supporting surface.

19. An adjustable support structure according to claim 2, wherein the first support member includes an elongated slot adapted to permit adjustment of the first support member.

20. An adjustable support structure according to claim 19, including means for selectively releasably retaining the adjustment of the first support member.

21. An adjustable support structure according to claim 20, wherein the means for selectively releasably retaining the first support member comprises a bolt threaded in a second opening in the attaching member.

22. An adjustable support structure according to claim 4, including means for selectively releasably retaining the second support member relative to the first support member.

23. An adjustable support structure according to claim 22, wherein the means for selectively releasably retaining the second support member relative to the first support member comprises a bolt threaded in an opening in one of said two plates.

24. An adjustable support structure according to claim 2, wherein said adjusting rod is rotatably and reciprocatable mounted within a guide mounted on the second support member.

25. An adjustable support structure according to claim 24, wherein at least a portion of the adjusting rod is threaded and adapted to mate with a threaded opening in said guide.

26. An adjustable support structure according to claim 24, wherein at least a portion of the adjusting rod includes helical threads adapted to mate with a helically threaded opening in said guide.

27. An adjustable support structure according to claim 2, wherein the means for rotating the adjusting rod comprises a handle mounted at an end portion thereof.

28. An adjustable support structure according to claim 2, wherein the abutting plate is rotatably mounted at one end of the adjusting rod.

* * * * *